May 6, 1952 R. J. BONDLEY ET AL 2,595,756

CONTROL MEANS FOR HIGH-FREQUENCY POWER OSCILLATORS

Filed Aug. 9, 1950

Inventors:
Ralph J. Bondley,
Harold W. Lord,
by Paul A. Frank
Their Attorney.

Patented May 6, 1952 2,595,756

UNITED STATES PATENT OFFICE 2,595,756

CONTROL MEANS FOR HIGH-FREQUENCY POWER OSCILLATORS

Ralph J. Bondley, Scotia, and Harold W. Lord, Schenectady, N. Y., assignors to General Electric Company, a corporation of New York Application August 9, 1950, Serial No. 178,534

2 Claims. (Cl. 250—36)

Figure 1:
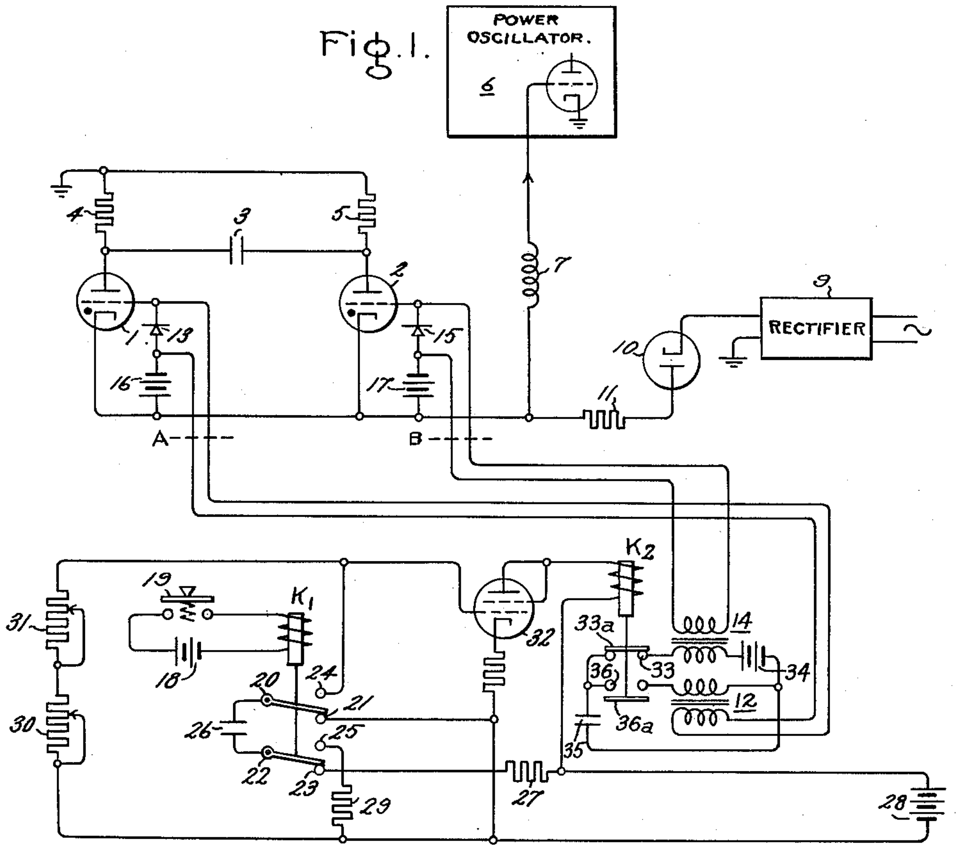

This invention relates to electronic timing circuits for controlling high frequency power oscillators and more particularly to such timing circuits as control the time interval during which a particular oscillation takes place.

Certain uses for high frequency power oscillators, such, for example, as high frequency heating and high frequency welding, carry the requirement that the duration of the oscillation be accurately controlled. In such applications, a condition which is often encountered is that the power from the oscillator must be interrupted at a very high rate. Such an application is the brazing of articles of manufacture in automatic feed systems.

A contactor in the anode power supply of the power oscillator tubes is generally used for turning the power on or off and because this contactor must handle the full power requirements of the oscillator, it is by necessity large and massive. In such applications where the rate at which the power is interrupted is very high, the life of the electrical contactor bearings and tips is very short.

For high frequency welding applications where the duration of the current may be only a few milliseconds, the accuracy of the time obtained by using contactors in the anode circuit is insufficient to give consistent results. This inaccuracy is, of course, due to the mass on the contactor arm and to the arcing at the contactor tips. The length of time required for the arc to decay after the contactor is opened depends upon the particular part of the cycle at which the break appears.

It is, therefore, an object of this invention to provide an electronic control circuit responsive to two sequentially applied power pulses to initiate and terminate the oscillation of a high power oscillator.

Another object of this invention is to provide a circuit which accurately and automatically controls the time duration of oscillations from a high frequency oscillator in response to power pulses provided at predetermined intervals.

In the attainment of the foregoing objects we have designed an electronic circuit which, by controlling the bias voltage applied to the control grid of a power oscillator tube, controls the operation of the oscillator. Using this system it is unnecessary to interrupt the anode voltage, and only a small amount of power is required to trigger the control grid of the oscillator tube. According to the illustrated embodiment of this invention, a pair of thyratron tubes are connected back to back such that only one of the tubes may conduct at any one time. A source of high negative voltage is connected through a rectifier tube and through a current limiting resistor to the control grid of the oscillator. The anodes of the thyratrons are connected to ground through resistors, and the cathodes are connected to the control electrode of the oscillator. Because of the high negative voltage bias on the grid of the oscillator tube, the tube is prevented from conducting. When the first one of the thyratrons is fired, such as by means of a positive trigger pulse from another electronic circuit, it supplies a low resistance path to ground which in turn makes the voltage on the control grid of the oscillator tube less negative so that the tube may conduct and thus allow the system to oscillate. This thyratron continues to conduct current and, thus, permits the oscillator to function until the other thyratron is fired. The firing of the second thyratron renders the first thyratron non-conductive by means of a commutated voltage and provides a high resistance path in the control circuit of the oscillator tube. Insertion of this high resistance permits the grid current flowing from the oscillator to build up such a high negative bias that it will cause the oscillator tube to block. The control electrode of the oscillator tube, as the high negative bias leaks off via the high resistance path, is returned to approximately the value of the source of negative voltage, which value is sufficient to prevent the resumption of oscillations. Consequently, the oscillator tube conducts only during the time interval between the trigger pulse applied to the first thyratron and the trigger pulse applied to the second thyratron except for a few oscillations which may occur after the second pulse while the blocking voltage is building up. We show two possible timing circuits for supplying the trigger pulses to the two thyratrons. One of these circuits is for low speed operation where an exact time duration of the oscillation is not required, and another circuit is for operation where a more precise time of oscillation is necessary.

For further objects and advantages and for a better understanding of our invention, attention is now directed to the following description and accompanying drawing, and also to the appended claims.

Figure 2:
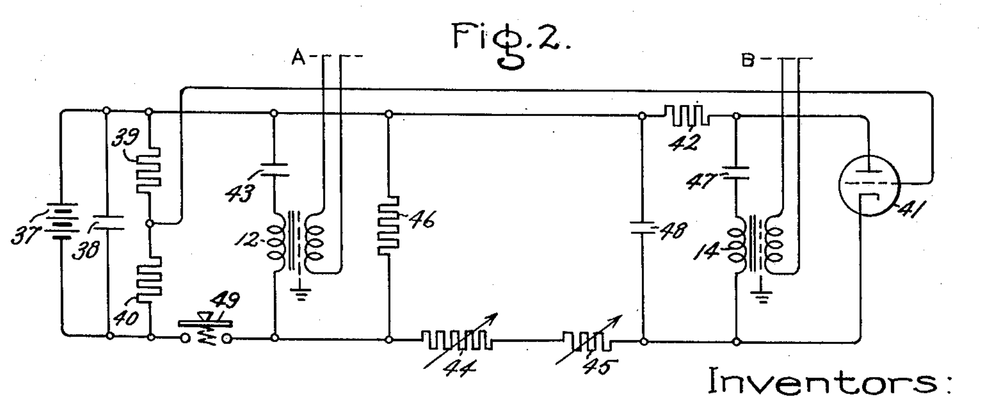

In the drawing, Fig. 1 is an electronic circuit for controlling a high frequency oscillator shown in association with an interval timing circuit; and Fig. 2 is an alternate interval timing circuit.

Referring to Fig. 1, a pair of thyratron discharge devices 1 and 2 are connected in back to back relation; that is, the anodes are connected together by a capacitor 3, their cathodes are directly connected together, and their anodes are resistively coupled through resistors 4 and 5 to a common point which in this particular circuit embodiment is ground. A power oscillator 6 is provided with a grounded cathode and a control electrode that is coupled through a high frequency choke coil 7 to the cathodes of thyratrons 1 and 2. A source of direct voltage 9, which is a conventional rectifier supplied with an alternating voltage, has its positive terminal connected to ground. The output of source 9 is electrically connected to the cathode of a diode discharge device 10; the anode of which is resistive coupled to the cathodes of thyratrons 1 and 2 by a resistor 11. It will be understood that device 10 need not necessarily be a discharge device but may be one of many other high current type rectifiers known in the art, such, for example, as selenium, or copper oxide rectifiers. Discharge device 10 in conjunction with its source of power acts as a voltage limiter and supplies a minimum bias such that when thyratrons 1 and 2 are in the non-conducting state the control grid of power oscillator 6 is held at a voltage which is approximately equal to or more negative than the voltage of source 9. As a means of supplying positive power pulses to the thyratrons, the secondary winding of a transformer 12 is connected across a rectifying device 13 and the secondary winding of a transformer 14 is connected across a rectifying device 15. Rectifiers 13 and 15 are connected to the control grids of thyratrons 1 and 2, respectively, such that their positive terminals are connected to the control grids. A source of direct voltage 16 is connected between the cathode of thyratron 1 and the negative terminal of device 13, and a similar source of direct potential 17 is connected between the cathode of thyratron 2 and the negative terminal of device 15.

Oscillator 6 is held in a non-conducting state by the negative bias applied from source 9 to the control grid of the oscillating tube. The thyratron 2 is fired when a positive voltage is impressed on the grid. Thyratron 2 is a tube capable of conducting relatively high peak current, and when it fires the voltage drop across resistor 11 is very high and the potential on the grid of oscillator 6 is made less negative to the extent that the tube conducts. Consequently, oscillator 6 may supply its high power, high frequency output. During oscillation the potential across resistor 5, which has a small resistance relative to resistor 11, is increased due to the rectified grid current of the oscillator. While thyratron 2 is conducting, capacitor 3 is charged up because of the voltage drop across resistor 5 while thyratron 1 is in a non-conducting state. At a determinable time after the impulse from transformer 14 occurs, an impulse voltage is provided in the primary winding of transformer 12 which produces a positive direct voltage on the control electrode of device 1, causing it to conduct. When thyratron 1 conducts, its anode-cathode voltage suddenly decreases. Since the capacitor 3 is connected between the anodes of thyratrons 1 and 2, the anode of thyratron 2 is made negative with respect to its cathode, interrupting the flow of current and permitting its grid to regain control. Resistor 4 has a large ohmic value, and, because thyratron 1 conducts only a relatively small amount of current, it can be smaller than thyratron 2. Consequently, because of the high ohmic value of resistor 4, the oscillator grid current bears up such a high negative bias that the oscillator tube blocks. Tube 10 allows this voltage to be more negative than the bias from rectifier 9 but, as previously explained, does not permit it to become less negative than the source. Following the firing of thyratron 1, oscillations cease and cannot start again because the control electrode of oscillator 6 is held to a value comparable to the voltage of rectifier 9. Oscillator 6 remains in this cut off condition and capacitor 3 discharges and then is charged to the opposite polarity to that which it had when thyratron 2 was conducting. When power is again desired another positive pulse is impressed upon thyratron 2 which is again caused to conduct, its anode voltage drops in value, which, because of the charge on capacitor 3, impresses a voltage on the anode of thyratron 1, negative with respect to its cathode, which interrupts the current and permits the grid to regain control in the manner previously explained. Oscillator 6 is thus permitted to again oscillate until another pulse fires thyratron 1.

To supply the start and stop pulses to thyratrons 1 and 2, we have designed a circuit comprising a relay $K_1$ which has an energizing coil connected in series with a direct voltage source 18 and a push button type switch 19. In the de-energized position, the contactors of relay $K_1$ are connected between terminals 20 and 21 and between terminals 22 and 23, and in the energized position the contactors are connected between terminals 20 and 24 and between terminals 22 and 25. A capacitor 26 is connected between terminals 20 and 22 such that when relay $K_1$ is de-energized, the capacitor is connected in series with a resistor 27 across a source of direct voltage 28. Capacitor 26 is thus charged to a voltage substantially equal to the voltage of source 28. Upon the energizing of relay $K_1$ by the closing of switch 19, capacitor 26 is connected in series with a resistor 29, a variable resistor 30, and another variable resistor 31. At the same instant of time, the control electrode of an electron discharge device 32 is thus reduced to a negative potential such that tube 32 is non-conductive and interrupts the current through the energizing coil of relay $K_2$.

When relay $K_2$ is de-energized, contacts 33 are bridged by movable contact 33*a* and a direct voltage source 34 is serially connected with the primary winding of transformer 14 and a capacitor 35. A pulse of current thus passes through transformer 14, which, as heretofore explained, fires thyratron 2. The voltage across capacitor 26 decays at a rate determined by the time constant of the discharging circuit until the voltage on the control electrode of device 32 again allows conduction. At this time, relay $K_2$ is energized and contacts 36 are short-circuited. Capacitor 35 thus discharges through the primary winding of transformer 12 which transmits a pulse of voltage to fire thyratron 1. Adjustment of the values of resistors 30 and 31 adjusts the time constant of the discharge circuit of capacitor 26 and hence the time of oscillation of oscillator 6. Two variable resistors of substantially different value are used so that fine adjustment is possible throughout a wide range of oscillation times.

Referring to Fig. 2, a source of direct voltage 37 charges up a capacitor 38 which is connected across its terminals and also supplies current through a pair of voltage dividing resistors 39 and 40 which are serially connected across its terminals. The junction of resistors 39 and 40 is connected to the control grid of an electron discharge device 41. The anode of device 41 is connected through a resistor 42 to the positive terminal of source 37. A series connection of a capacitor 43, the primary winding of transformer 12, a variable resistor 44, and a resistor 45 is located between source 37 and the cathode of device 41. A resistor 46 parallels the series connection of capacitor 43 and the primary winding of transformer 12. A capacitor 47 is connected in series with the primary winding of transformer 12 between the anode and the cathode of device 41. A capacitor 48 is connected between the positive terminal of source 37 and the junction of resistor 45 and the cathode of device 41. A switch 49 is connected between the negative terminal of source 37 and the junction of the primary winding of transformer 12 and resistor 44.

Short-circuiting switch 49 causes current to flow from source 37 through the primary winding of transformer 12 until capacitor 43 is charged up. Because capacitor 43 is quickly charged, this current takes the form of an impulse. This impulse of current through the primary winding of transformer 12 is coupled through the secondary winding to thyratron 2. Capacitor 48 is charged by means of source 37 through resistors 44 and 45 and the time required for it to charge is determined by the time constant of capacitor 48 and resistors 44 and 45. As capacitor 48 charges up, the anode voltage of device 44 increases until it is at a high enough level for tube 41 to conduct. At this time capacitor 47, which has been slowly charged from source 37, is suddenly discharged sending a pulse of current through the primary winding of transformer 14. This pulse of voltage is coupled to the secondary winding of transformer 14 and, as hereinbefore explained, fires thyratron 1. The values of resistors 44 and 45 may thus be used to adjust the time of oscillation of oscillator 6.

The circuit of Fig. 1 for supplying the positive impulse voltages is not as accurate as is the circuit of Fig. 2 because it depends upon the operation of relays. The circuit of Fig. 2 does not have any mechanically moving parts and, therefore, has a time interval between the pulses which is determined only by the time constants of the circuit elements. Consequently, the variation of time intervals between pulses is very small. The timing circuit of Fig. 1 finds application in high frequency heating circuits where the exact time of oscillation is not critical, and the circuit of Fig. 2 finds application in high frequency welding operations where the length of oscillation is an important factor.

While it will be understood that the circuit specifications of the timing circuit of Fig. 1 may vary according to the design for any particular application, the following circuit specifications have been found satisfactory for a timing circuit controlling high frequency heating apparatus.

| | |
|---|---|
| Resistor 4 | 20,000 ohms |
| Resistor 11 | 3,000 ohms |
| Thyratron 1 | FG17 |
| Thyratron 2 | GL678 |
| Device 10 | GL866 |
| Capacitor 3 | 0.5 mfd. |

While this invention has been described by particular embodiments thereof, it will be understood that those skilled in the art may make many changes and modifications without departing from this invention. Therefore, by the appended claims we intend to cover all such changes and modifications which fall within the true spirit and scope of this invention.

What we claim as new and desire to secure by Letters Patent of the United States is:

1. A control circuit for initiating and terminating oscillation of a high power oscillator comprising a first and second thyratron discharge device, a capacitor connected between the anodes of said thyratron devices, the anode of said first thyratron device being connected to ground through a relatively low resistance and the anode of said second thyratron device being connected to ground through a relatively high resistance, means negatively biasing the control grid of said thyratron devices, a source of negative potential connected to the cathodes of said thyratron devices and to the control grid of said oscillator, a relatively high resistance and a diode discharge device serially connected between said source of negative potential and said thyratron device cathodes, said diode device constituting a rectifier normally maintaining said oscillator grid bias at least as negative as said negative potential source, a source of positive potential connected to the grids of said thyratron devices, and electronic circuit means controlling said positive potential source to provide sequential voltage pulses on the control grids of said thyratrons alternately to fire said first thyratron device to provide a relatively low resistance path from said oscillator grid to ground whereby operation of said oscillator is initiated and to fire said second thyratron device and thereby quench said first thyratron device to provide a relatively high resistance path only from said oscillator grid to ground whereby operation of said oscillator is terminated.

2. A control device for initiating and terminating oscillation of a high power oscillator comprising a first and second thyratron discharge device, a capacitor connected between the anodes of said thyratrons, the anode of said first thyratron being connected to ground through a relatively low resistance and the anode of said second thyratron being connected to ground through a relatively high resistance, means negatively biasing the control grids of said thyratrons, a source of negative potential connected to the cathodes of said thyratrons and to the control electrode of said oscillator, an inductor connected between said oscillator control electrode and said negative potential source, a relatively high resistance and a diode discharge device serially connected between said source of negative potential and both said inductor and said thyratron cathodes, a source of positive potential connected to the grids of said thyratrons, and electronic circuit means controlling said positive potential source sequentially to provide voltage pulses on the control grids of said first and second thyratrons to initiate and to terminate oscillation by alternately firing said first and quenching said second thyratron whereby a relatively low resistance path is provided from said oscillator control electrode to ground and firing said second and quenching said first thyratron whereby a relatively high resistance path only is provided from said oscillator control electrode to ground.

RALPH J. BONDLEY.
HAROLD W. LORD.

REFERENCES CITED

The following references are of record in the file of this patent:

UNITED STATES PATENTS

| Number | Name | Date |
|---|---|---|
| 2,098,052 | Lord | Nov. 2, 1937 |
| 2,181,568 | Kotowski et al. | Nov. 28, 1939 |
| 2,433,282 | Lord | Dec. 23, 1947 |